United States Patent
Hashimoto et al.

(10) Patent No.: US 8,578,815 B2
(45) Date of Patent: Nov. 12, 2013

(54) SWITCH FOR VEHICLE

(75) Inventors: Kaneaki Hashimoto, Haga-gun (JP); Masaaki Abe, Utsunomiya-shi (JP); Sadahiro Yokoyama, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 13/132,460

(22) PCT Filed: Dec. 2, 2009

(86) PCT No.: PCT/JP2009/006529
§ 371 (c)(1),
(2), (4) Date: Jun. 2, 2011

(87) PCT Pub. No.: WO2010/064419
PCT Pub. Date: Jun. 10, 2010

(65) Prior Publication Data
US 2011/0232412 A1 Sep. 29, 2011

(30) Foreign Application Priority Data
Dec. 2, 2008 (JP) .................................. 2008-307419

(51) Int. Cl.
*B62D 1/06* (2006.01)
(52) U.S. Cl.
USPC .................................. 74/557; 74/555; 74/553
(58) Field of Classification Search
USPC .................................... 74/552, 553, 555, 557
See application file for complete search history.

(56) References Cited

U.S. PATENT DOCUMENTS

| | | | | |
|---|---|---|---|---|
| 5,095,409 | A | * | 3/1992 | Dematteo et al. ................ 362/23 |
| 5,336,859 | A | * | 8/1994 | Wojtanek et al. ............. 200/315 |
| 5,721,541 | A | * | 2/1998 | Repp et al. ....................... 341/20 |
| 5,884,528 | A | * | 3/1999 | Ludanek et al. ............. 74/473.3 |
| 5,957,001 | A | * | 9/1999 | Gualtieri et al. ............ 74/473.12 |
| 6,225,578 | B1 | * | 5/2001 | Kobayashi et al. ........... 200/5 R |
| 6,246,808 | B1 | * | 6/2001 | Mallon ........................... 385/16 |
| 6,264,513 | B1 | * | 7/2001 | Marsh ............................. 440/53 |
| 6,474,187 | B1 | * | 11/2002 | Vollmar ...................... 74/336 R |
| 6,525,283 | B2 | * | 2/2003 | Leng ............................. 200/339 |
| 6,556,149 | B1 | * | 4/2003 | Reimer et al. ................... 341/20 |

(Continued)

FOREIGN PATENT DOCUMENTS

| | | |
|---|---|---|
| CN | 201102476 Y | 8/2008 |
| CN | 201214443 Y | 4/2009 |

(Continued)

OTHER PUBLICATIONS

Notice of Allowance issued in JP Application No. 2012-037938 mailed Apr. 23, 2013.

(Continued)

*Primary Examiner* — David M Fenstermacher
(74) *Attorney, Agent, or Firm* — Rankin, Hill & Clark LLP

(57) ABSTRACT

A switch for a vehicle includes: a first operating member provided on a mounting surface of the vehicle, the first operating member being operable by tilting; and a plurality of projections provided on the first operating member, the projections being operable by pushing, wherein the first operating member is shaped line symmetrically so that a central part of the first operating member is dented most; and the projection projects forward with respect to the central part of the first operating member, and the projection is uplifted along an outer wall part of the first operating member.

12 Claims, 4 Drawing Sheets

(56) References Cited

U.S. PATENT DOCUMENTS

| | | | |
|---|---|---|---|
| 6,894,234 B1 * | 5/2005 | Sottong | 200/5 R |
| 6,925,315 B2 * | 8/2005 | Langford | 455/575.1 |
| 7,148,437 B2 * | 12/2006 | Wahl et al. | 200/61.54 |
| 7,268,305 B2 * | 9/2007 | Schmidt et al. | 200/5 R |
| 7,278,509 B2 * | 10/2007 | Schroder et al. | 180/333 |
| 7,595,722 B2 * | 9/2009 | Heimermann et al. | 340/461 |
| 7,602,278 B2 * | 10/2009 | Prost-Fin et al. | 340/438 |
| 7,605,694 B2 * | 10/2009 | Prost-Fin et al. | 340/438 |
| 7,703,570 B2 * | 4/2010 | Ringger et al. | 180/336 |
| 7,863,822 B2 * | 1/2011 | Stoschek et al. | 315/77 |
| 2007/0077058 A1 | 4/2007 | Kontani | |

FOREIGN PATENT DOCUMENTS

| | | |
|---|---|---|
| DE | 4225354 A1 | 2/1994 |
| DE | 102005046328 A1 | 4/2007 |
| JP | 2003-109471 | 4/2003 |
| JP | 2003-233458 | 8/2003 |
| JP | 2004-319181 A | 11/2004 |
| JP | 2005-011678 | 1/2005 |
| JP | 2006-096245 | 4/2006 |
| JP | 2006-196309 A | 7/2006 |
| JP | 2008-277018 | 11/2008 |
| JP | 2009-170196 | 7/2009 |

OTHER PUBLICATIONS

Chinese Office Action and English translation of Search Report, Application No. 200980147979.2, dated May 15, 2013, 7 pages.

* cited by examiner

SWITCH FOR VEHICLE

TECHNICAL FIELD

The present invention relates to a switch for a vehicle. This switch for a vehicle is provided on, for example, a steering wheel and the like.

The present application claims priority from Japanese Patent Application No. 2008-307419, filed Dec. 2, 2008, the content of which is incorporated herein by reference.

BACKGROUND ART

Conventionally, a switch for a vehicle is known which is cross shaped (cross type). For instance, this cross shaped switch provided on a steering wheel is used as an inputting device for a displaying device being mounted on a vehicle. Since the switch is cross shaped, the switch is superior in that the selection of setting items displayed on the displaying device in the lateral direction and in the vertical direction may be operated in a sensory manner in the lateral direction and in the vertical direction. In this way, the operability is enhanced. (See Patent Document 1.)

PRIOR ART DOCUMENT

Patent Document

[Patent Document 1] Japanese Unexamined Patent Application, First Publication No. 2006-96245

DISCLOSURE OF INVENTION

Problems To Be Solved By the Invention

However, according to the conventional switch for a vehicle, a control by the switch operation is altered depending on the rudder angle of the steering. In this way, the direction of the selection of items does not change even when the steering wheel is operated. However, it is necessary to perform the operation while identifying the portion of the switch that needs to be pushed. As a result, there is a problem in that the operation cannot be performed easily.

Therefore, an object of the present invention is to provide a switch for a vehicle which allows a quick, sensory recognition of the portion which needs to be operated, thereby enhancing the operability.

Means For Solving the Problems (1) A switch for a vehicle according to an embodiment of the present invention includes a first operating member provided on a mounting surface of the vehicle, the first operating member being operable by tilting; and a plurality of projections provided on the first operating member, the projections being operable by pushing. Here, the first operating member is shaped line symmetrically so that a central part of the first operating member is dented most. Moreover, the projection projects forward with respect to the central part of the first operating member, and the projection is uplifted along an outer wall part of the first operating member.

(2) In addition, the switch for the vehicle may be configured as follows: the switch further includes a second operating member at the central part of the first operating member, wherein the second operating member is curved in an opposite direction compared to the first operating member.

(3) In addition, the switch for the vehicle may be configured as follows: the projection or the second operating member project forward with respect to the mounting surface.

Effects of the Invention

According to (1), the projection, which is a portion of the first operating member that may be pressed, can be recognized in a quick, sensory, and clear manner. Thus, it is possible to perform an operation without viewing. At the same time, since the possibility of operation errors is reduced, the operability may be enhanced.

According to (2), the second operating member, which is different from the first operating member and is curved in an opposite direction, may be recognized quickly without viewing. At the same time, since the second operating member is included in the first operating member, the quality of external appearance may be enhanced.

According to (3), the projection may be recognized reliably as a portion which is different from another portion and should be operated. As a result, it is possible to perform the operation with reliability.

EMBODIMENTS FOR CARRYING OUT THE INVENTION

Hereinafter, a switch for a vehicle according to a first embodiment of the present invention is described according to the diagrams. Incidentally, the present embodiment is described for the purpose of facilitating an understanding of the gist of the present invention. The following description does not limit the present invention in any way, unless otherwise specifically noted.

Figure 1:
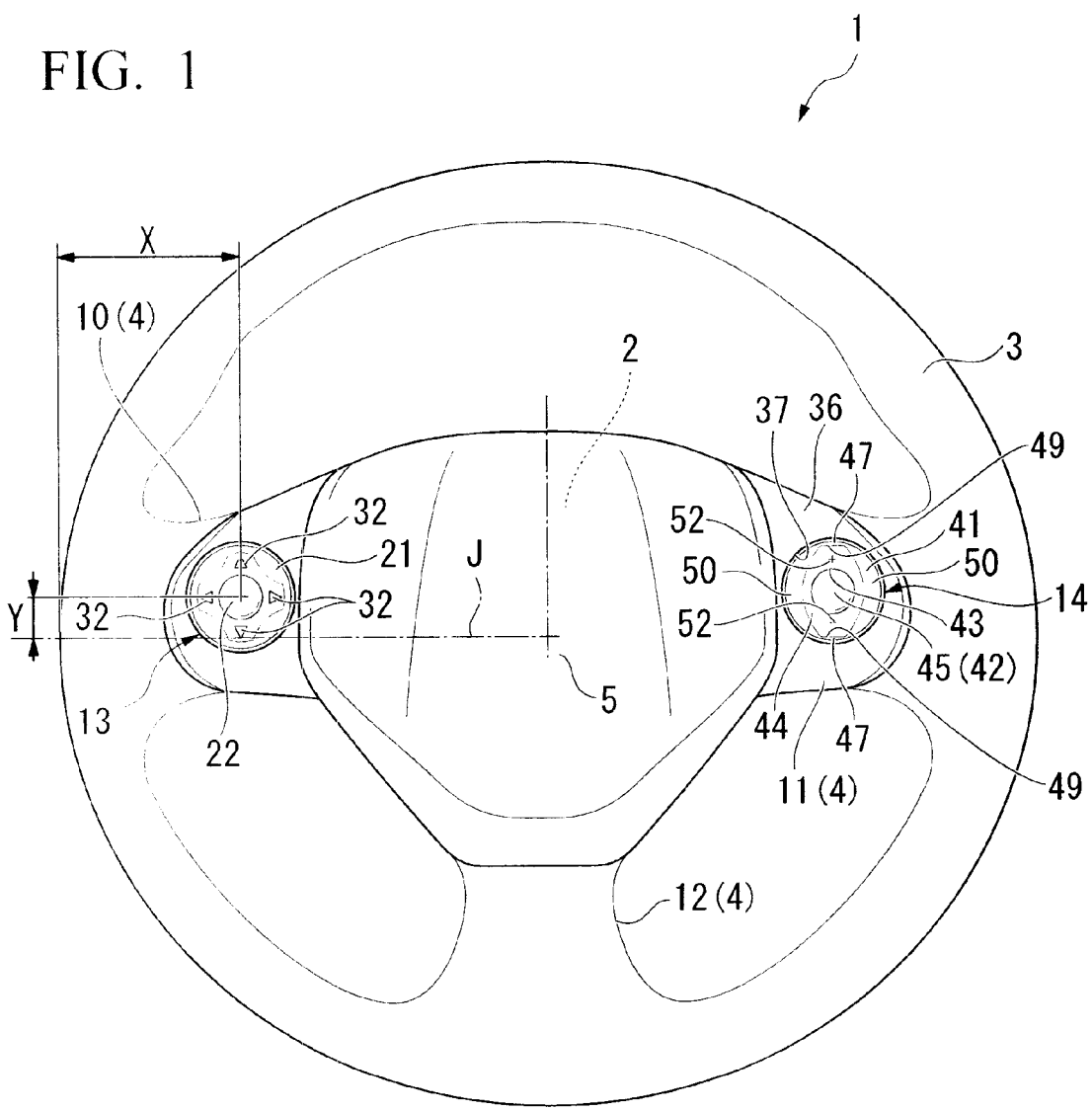
FIG. 1 is a frontal view of a steering wheel according to a first embodiment of the present invention.

As shown in FIG. 1, the steering wheel 1 comprises a boss part 2, which is fixed to a non-diagrammed steering shaft; a rim part 3, an annular rim part 3, which is held by a driver; and a spoke part 4 connecting the rim part 3 with the boss section 2. A non-diagrammed airbag is contained in the boss part 2. A horn switch 5 is provided on an upper surface of the boss part 2.

When the steering wheel 1 is at a neutral position, the spoke part 4 comprises a left side spoke part 10, which extends towards the left side; a right side spoke part 11, which extends towards the right side; and a lower side spokes part 12, which extends towards the lower side. On each of the left side spoke part 10 and the firth side spoke part 11, a left side switch for a vehicle 13 and a right side switch for a vehicle 14 are respectively provided. Here, the left side switch for a vehicle 13 and the right side switch for a vehicle 14 are placed at a position distanced by Y in an upper direction with respect to a lateral axial line J of the left side spoke part 10 and the right side spoke part 11. Further, the left side switch for a vehicle 13 and the right side switch for a vehicle 14 are placed at a position distanced by X towards an inner side from an outer rim of the rim part 3. As a result, a passenger holding the steering wheel may use his or her thumb to operate the left side switch for a vehicle 13 and the right side switch for a vehicle 14 easily.

Figure 2:
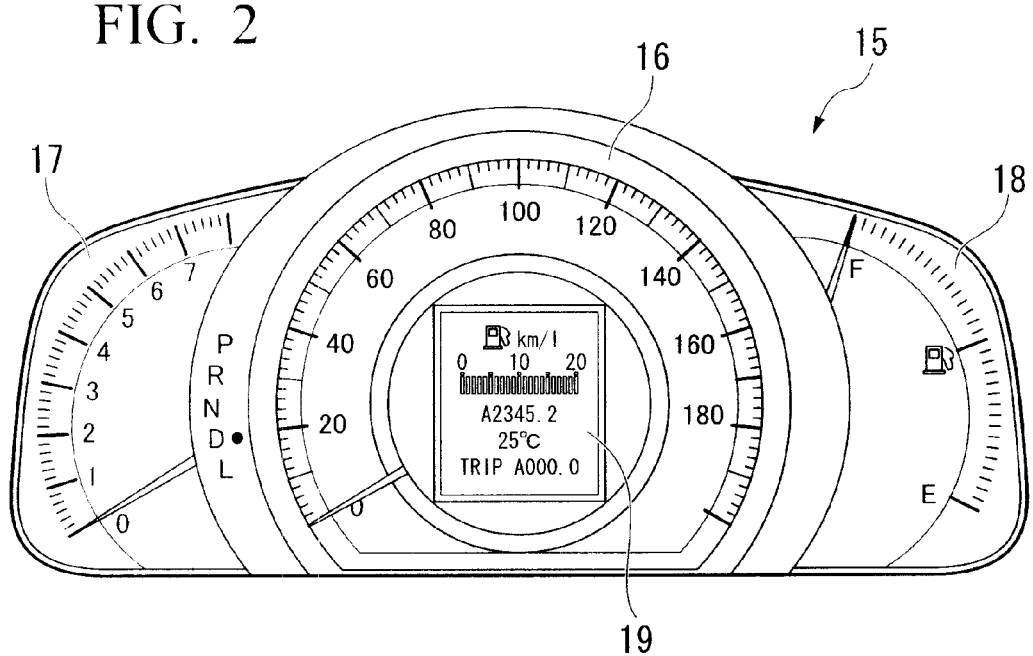
FIG. 2 is a frontal view of a meter panel according to the above embodiment.

FIG. 2 shows a meter panel 15. A speed meter 16 is placed at a central portion of the meter panel 15. A tachometer 17 is placed at a left side. A fuel meter 18 is placed at a right side. The meter panel 15, the speed meter 16, and the tachometer 17 are placed adjacently. A multi-information display 19 is placed at a central portion of the speed meter 16.

Usually, an operating screen concerning an audio, navigation, air conditioner, and a trip meter is displayed on the multi-information display 19. However, this multi-information display 19 is also used as a displaying unit for making a customized setting.

In particular, a customized setting refers to various basic settings of a vehicle when it is assumed that a plurality of drivers use the vehicle in a co-owned manner. Examples of the basic settings include the door and window settings, a cooperative resetting of the trip meter and the fueling of an average gas mileage, and settings relating to a smart key for each driver. When these settings are made, an item information for customization is displayed on the multi-information display 19 in a hierarchical structure. The left switch for a vehicle 13, described above, is used in order to select and determine the selection items of the hierarchical structure, which are used for customization.

Figure 3:
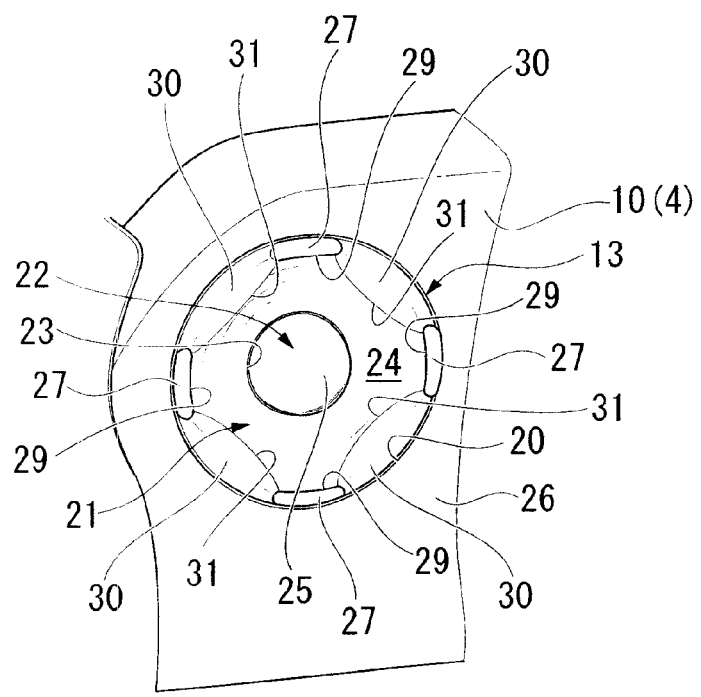
FIG. 3 is a perspective view of a switch for a vehicle at a left side according to the above embodiment.
Figure 4:
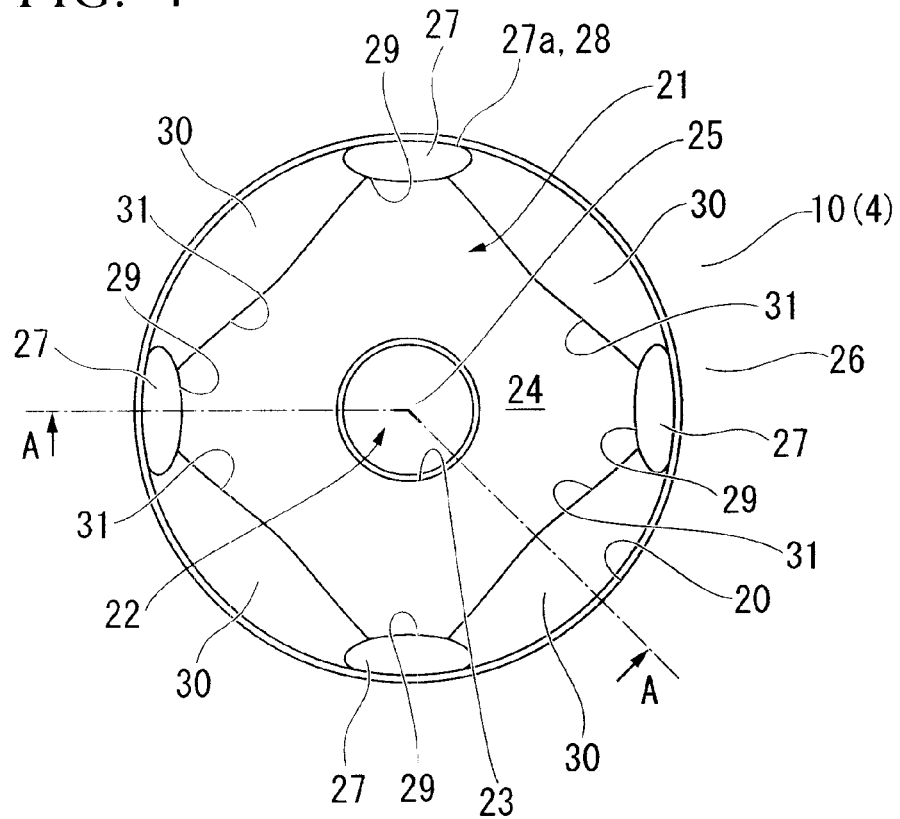
FIG. 4 is a frontal view of a switch for a vehicle at a left side according to the above embodiment.
Figure 5:
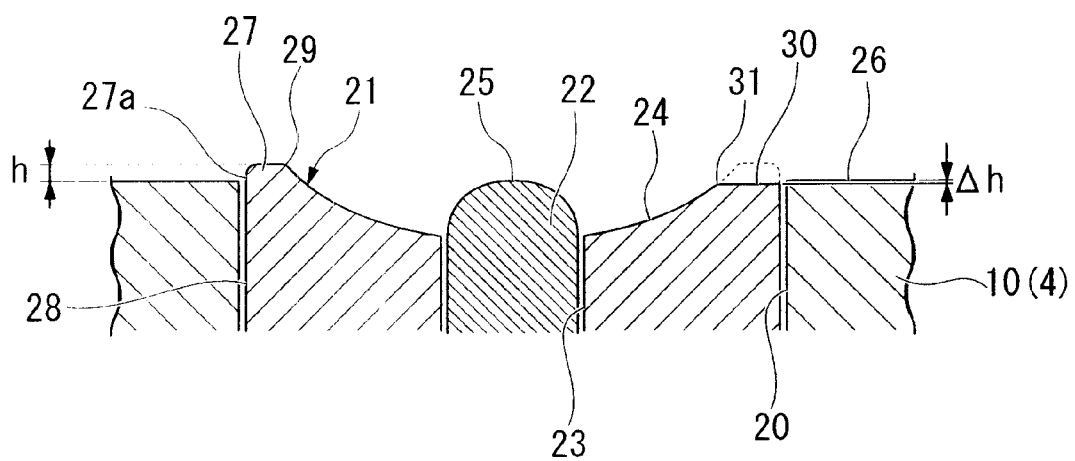
FIG. 5 is a cross sectional view along line A-A in FIG. 4.

As indicated in FIGS. 3 to 5, the left switch for the vehicle 13 comprises a first operating member 21, which is circular seen from a frontal view. This first operating member 21 is attached to a circular concaved part 20, which is formed on a mounting surface 26 of the left side spoke part 10.

The first operating member 21 is made from a single resin material. This first operating member 21 may be moved in a tilting manner only in the left, right, upper, and lower directions due to a non-diagrammed mechanism provided in an interior portion. When the first operating member 21 is tilted, a contact point provided in the interior portion is conducted. As a result, an item corresponding to the direction of the tilting is selected.

The first operating member 21 comprises a curved part 24. The cross section of the curved part 24 is curved so that a central part of the curved part 24 is concaved the most to the back side. This curved part 24 is formed continuously towards the outer rim. At a central portion of this curved part 24, an insertion hole 23 of a second operating member 22 is provided. The second operating member 22 is provided in this insertion hole 23 so that the second operating member 22 may be pressed.

The cross section of the second operating member 22 is circular. This second operating member 22 comprises a peak part 25, which is curved in an opposite direction with respect to the first operating member 21. In other words, the peak part 25 is projected towards the front side. The second operating member 22 performs a determining operation in which the peak part 25 is pressed. Incidentally, the height of this peak part 25 is set to be equal to the height of the mounting surface 26 of the left side spoke part 10. The height of the peripheral rim part of the second operating member 22 is set to be equal to the height of the rim part of the insertion hole 23, i.e., the mounting surface 26 of the left side spoke part 10.

The first operating member 21 comprises a projection 27 at the outer rim part in the left, right, upper, and lower directions. The projection 27 protrudes towards the front side compared to the other parts, i.e., the upper left, upper right, lower left, and lower right directions. The projection 27 is placed at an interval of 90 degrees along a concentric circle with respect to the central portion. The outer side surface 27a of the projection 27 protrudes along a curved outer wall part 28 of the first operating member 21. Further, as shown in FIG. 5, the outer side surface 27a protrudes towards the front side by a height of h compared to the mounting surface 26 of the left side spoke part 10. (See FIG. 5.) In addition, the inner peripheral side of the projection 27 comprises the edge part 29 as a ridge line.

Between each projection 27 at an outer rim part in the left, right, upper, and lower directions of the first operating member 21, a cut out part 30 is respectively provided at a position lower by Ah towards the back side compared to the mounting surface 26 of the first operating member 21. (See FIG. 5.) The cut out part 30 is obtained by cutting out the projection 27 horizontally. Here, an interior portion of the cut out part 30, formed so as to be placed between the projection 27, is connected by a ridge line 31, which is gradually arched so that an adjacent part with the curved part 24 is bent towards the inner side.

As a result, the first operating member 21, which comprises the second operating member 22 at a central part, becomes line symmetrical. The shape of the curved part 24 approximately becomes a rhombus such that the portions formed by the four projections 27, 27, 27, and 27 becomes the corner portions. Furthermore, the curved part 24 is shaped so that a width of a portion flanked by a pair of cut out parts 30 gradually becomes small, thereby reaching each projection 27. Incidentally, at a portion adjacent to the projection 27 of the curved part 24, a triangular shape 32 is respectively placed. The peak angle of each of the triangular shape 32 is oriented towards a direction corresponding to the left, right, upper, and lower directions. This triangular shape 32 is shown only in FIG. 1.

Meanwhile, as shown in FIG. 1, the right side switch for a vehicle 14 comprises a first operating member 41 which is shaped as a circle seen from a frontal view. This first operating member 41 is attached to a circular concaved part 37 formed on the mounting surface 36 of the right side spoke part 11.

The first operating member 41 of the right side switch for a vehicle 14 is also made from a single resin material. This right side switch for the vehicle 14 may be tilted only in the upper and lower directions due to a non-diagrammed mechanism provided in an interior portion. When the right side switch for a vehicle 14 is tilted, a contact point provided in the interior portion is conducted. As a result, an operation corresponding to the direction of the tilting (the upper and lower directions) is performed.

The first operating member 41 also comprises a curved part 44. The cross section of the curved part 44 is curved so that a central part of the curved part 44 is concaved the most to the back side. Further, this curved part 44 comprises an insertion hole 43 of the second operating member 42 at a central part. The second operating member 42 is attached to the insertion hole 43 so that the second operating member 42 may be pressed. The cross section of the second operating member 42 is circular. This second operating member 42 comprises a peak part 45, which is curved in an opposite direction with respect to the second operating member 42. In other words, the peak part 45 is projected towards the front side. Similar to the left side switch for a vehicle 13, a determining operation is performed by pressing this second operating member 42. Incidentally, the height of the peak part 45 of the second operating member 42 is set to be equal to the height of the mounting surface 36 of the right side spoke part 11.

A right side switch for a vehicle 14 is provided to select and determine a cruise control. This right side switch for the vehicle 14 comprises a projection 47 at the outer rim part in the upper and lower directions of the right side switch for a vehicle 14. The projection 47 protrudes towards the front side compared to the other parts, i.e., the left and right directions. The projection 47 is placed at an interval of 180 degrees along a concentric circle with respect to the central portion. The outer side surface of the projection 47 protrudes along a curved outer wall part of the first operating member 41. Further, similar to the left side switch for a vehicle 13, the outer side surface protrudes towards the front side compared to the mounting surface 36 of the right side spoke part 11. In addition, the inner peripheral side of the projection 47 comprises the edge part 49 as a ridge line.

Between each projection 47 at an outer rim part in the upper and lower directions of the first operating member 41 of the right side switch for a vehicle 14 formed as described above, a cut out part 50 is respectively provided at a position lower than the mounting surface 36 of the first operating member 41. In other words, similar to the left side switch for a vehicle 13, the cut out part 50 is provided in the left and right sides. The cut out part 50 is obtained by cutting out the projection 47 horizontally. Here, an interior portion of the cut out part 50, formed so as to be placed between the projection 47, is connected by a ridge line 51, which is gradually arched so that an adjacent part with the curved part 44 is bent towards the inner side.

As a result, the first operating member 41 of the right side switch for a vehicle 14 which comprises the second operating member 42 at a central part, becomes line symmetrical. The shape of the curved part 44 becomes approximately an ellipse such that a portion at which two projections 47, 47 are formed corresponds with the direction of the long axis. Furthermore, the curved part 44 is shaped so that a width of the upper and lower portions flanked by a pair of cut out parts 50 gradually becomes small, thereby reaching the projection 47. Incidentally, at a portion adjacent to the projection 47 of the curved part 44, a "+" mark 52 is placed in the upper direction. Further, in the lower direction, a "−" mark 52 is placed. These marks 52 are shown only in FIG. 1.

According to the first embodiment, when the user operates the left side switch for a vehicle 13, the first operating member 21 is used to select a customized item displayed on the multi-information display 19 of the meter panel 15. Thereafter, the second operating member 22 is pressed to make a determination. In other words, the first operating member 21 is used to press the upper and lower directions so that a curser is placed on an intended item and the intended item is selected. Further, the left, right, upper, and lower directions are pressed so that an intended item is selected from a selection of items set in a hierarchical manner in the displayed item. Lastly, the setting details are determined by the second operating member 22. In this way, the setting of the customized items is completed. Thus, by separating the functionalities between the first operating member 21 and the second operating member 22, a more reliable operation may be performed.

Incidentally, in order to make a selection of the selection items set in a hierarchical structure as described above, an operation of pressing in the left, right, upper, and lower directions is necessary. According to the first operating member 21, a user may place his or her finger on the curved part 24. Then, the user may move his or her finger in either the left, right, upper, or lower direction along a curved part 24 which is narrower towards the outer side in the radial direction. In this way, the user may determine the direction easily in a sensory manner, and can reach the projection 27. Furthermore, the user is able to recognize an operating point without view it by touching an edge part 29 which is higher than the mounting surface 26. Moreover, if the user presses a back side without viewing the edge part 29, a corresponding item may be selected in a reliable manner.

In this case, when the user's finger, which was slid along the curved part 24 does not reach the edge part 29 of the projection 27, but instead reaches the arch-shaped ridge line 31, which is a boundary between the cut out part 30 and the curved part 24, it is possible to recognize in a sensory manner with the user's finger tip that the finger is at a wrong position, since the ridge line 31 is located lower than the mounting surface 26. Therefore, the user is able to move his or her finger in the correct direction without viewing.

Of course, the second operating member 22, which is used to make a determination, can be easily recognized without viewing it because the second operating member 22 is located at a central part of the first operating member 21, and because the peak part 25, which is projecting towards the front side, may be recognized as an operating point.

In this way, the projection 27, which is a portion of the first operating member 21 which can be pressed, may be recognized promptly and clearly. Furthermore, the user may perform operations without viewing. Moreover, the possibility of erroneous operations can be reduced. As a result, it is possible to enhance the operability.

Furthermore, the peak part 25 of the second operating member 22, which is curved in an opposite direction compared to the first operating member 21, may be promptly recognized without viewing it. At the same time, the second operating member 22 is contained inside the first operating member 21. Moreover, the height of the rim part of the second operating member 22 matches with a height of the rim part of the insertion hole 23, i.e., the height of the curved part 24 of the first operating member 21. Due to these features, it is possible to improve the quality of external appearance.

Meanwhile, concerning the right side switch for a vehicle 14, when the user presses the upper and lower directions, the user may place his or finger on the curved part 44 of the first operating member 41, and slide his or her finger towards the upper or lower direction which becomes narrow, thereby easily recognizing the direction in a sensory manner and reaching the projection 47. Furthermore, the user may touch the edge part 49 of the projection 47, which is higher than the mounting surface 36, thereby recognizing an operating point without viewing it. Moreover, when the user presses the edge part 49 towards the back side, the user may reliably select the increase and decrease in the speed that is required.

Incidentally, when the user's finger, which was slid along the curved part 44 does not reach the edge part 49 of the projection 47, but instead reaches the arch-shaped ridge line 51, which is a boundary between the cut out part 50 and the curved part 44, it is possible to recognize in a sensory manner with the user's finger tip that the finger is at a wrong position, since the ridge line 51 is located lower than the mounting surface 36. Therefore, the user is able to move his or her finger in the correct direction without viewing.

In this way, the projection 47, which is a portion of the first operating member 41 which can be pressed, may be recognized promptly and clearly. Furthermore, the user may perform operations without viewing. Moreover, the possibility of erroneous operations can be reduced. As a result, it is possible to enhance the operability.

Furthermore, the peak part 45 of the second operating member 42, which is curved in an opposite direction compared to the first operating member 41, may be promptly recognized without viewing it. At the same time, the second operating member 42 is contained inside the first operating member 41. Moreover, the height of the rim part of the second operating member 42 matches with a height of the rim part of the insertion hole 43, i.e., the height of the curved part 44 of the first operating member 41. Due to these features, it is possible to improve the quality of external appearance.

Figure 6:
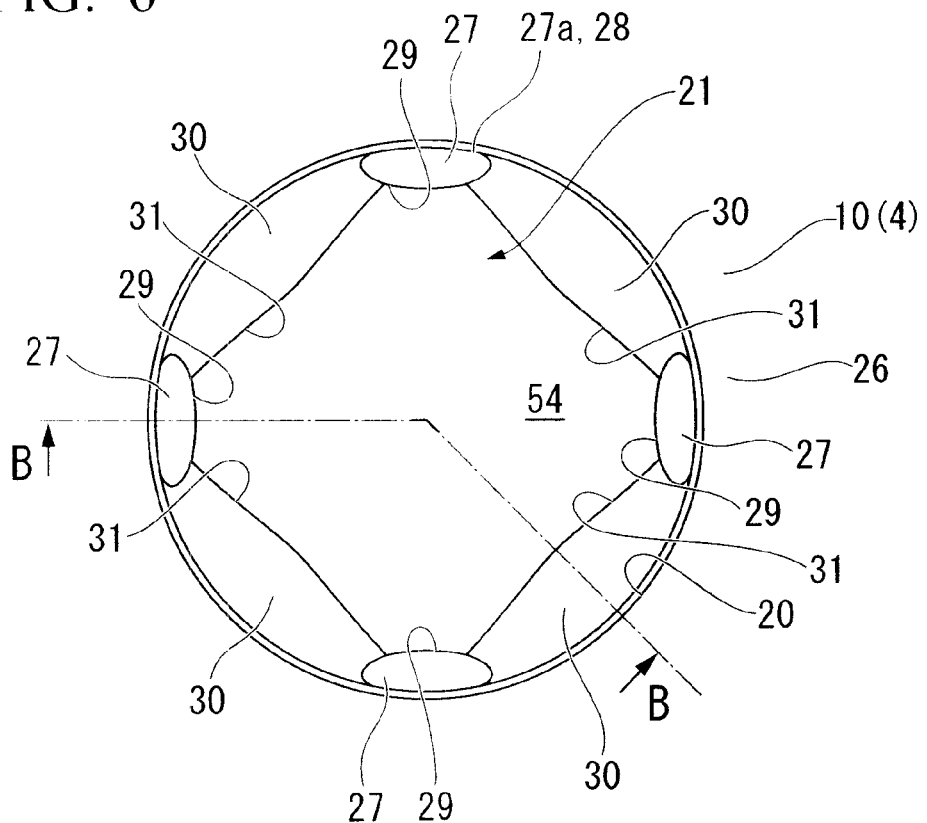
FIG. 6 is a frontal view of a switch for a vehicle at a left side according to a second embodiment of the present invention.
Figure 7:
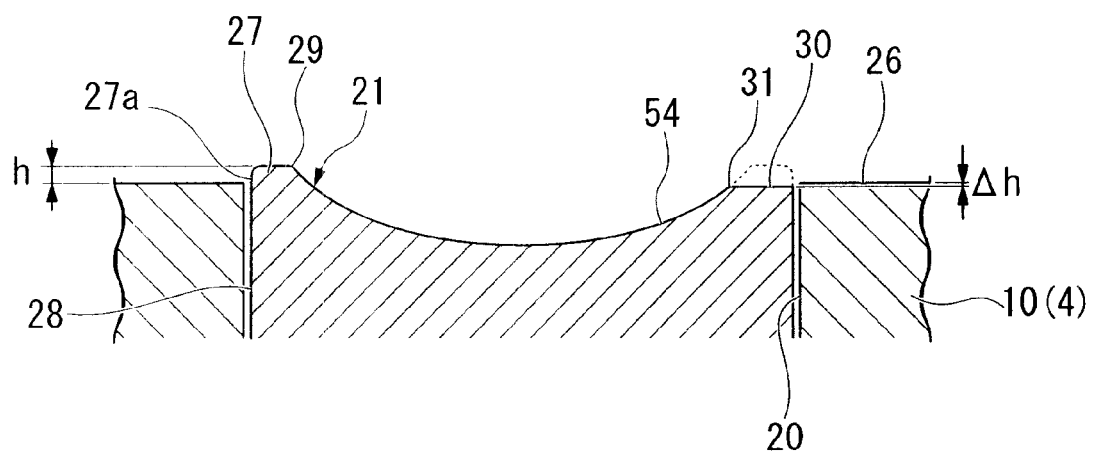
FIG. 7 is a cross sectional view along line B-B in FIG. 6.

A second embodiment of the present invention is shown in FIGS. 6 and 7. In this second embodiment, the second operating member 22 of the left side switch for a vehicle 13 according to the first embodiment is omitted. The operation of determination by the second operating member 22 is added to the operation of the first operating member 21, or an item of determination is added to the selection items of the multi-information display 19. In this way, the second operating member 22 may be omitted. Except for the point that an insertion hole is not provided at a central part of the curved part 54, the second embodiment is configured similarly to the first embodiment. Therefore, same reference numerals are used to refer to the same components. Description of overlapping components is not provided here.

Similar to the first embodiment described above, the second embodiment does not require a visual recognition of the place that is to be pressed. Consequently, the operability increases. At the same time, in the second embodiment, it is also possible to perform a corrective operation to move one's finger in the correct direction without visually seeing it. Moreover, in the second embodiment, it is also possible to reduce the possibility of erroneous operations.

Incidentally, the present invention is not limited to the embodiments described above. Alterations are possible as appropriate as long as the gist of the present invention is not deviated. For example, in the above description, an example was presented in which a switch for a vehicle is provided to a spoke part 4. However, a switch for a vehicle may be provided to a component other than the spoke part 4, such as a rim part 3 or a boss part (at a side of a horn switch) 2. Alternatively, a switch for a vehicle may be provided to a bracket installed on a spoke part 4 or a rim part 3.

In addition, the present invention may be applied to a switch provided on an instrument panel and the like other than the steering wheel 1. Furthermore, in the above description, an example was presented in which the first operating member 21, 41 is circular from a frontal view. However, the shape of the first operating member 21, 41 is not limited to a circle as long as the shape is line symmetrical. Furthermore, the number of projections 27, 47 is not limited to four with respect to the left side switch for a vehicle 13 and two with respect to the right side switch for a vehicle 14, as long as a plurality of projections are provided.

INDUSTRIAL APPLICABILITY

According to a switch for a vehicle based on the present invention, a projection, which is a portion of a first operating member that can be pressed, may be promptly and clearly recognized in a sensory manner. As a result, an operation can be performed without viewing. At the same time, the operability may be enhanced because the possibility of erroneous operation can be reduced. Further, a second operating member, which is curved in an opposite direction compared to the first operating member, may be recognized promptly without viewing it. At the same time, since the second operating member is contained within the first operating member, it is possible to enhance the quality of external appearance. Moreover, a projection may be recognized reliably as a component that should be operated, which is different from other components. In this way, an operation may be performed with reliability.

DESCRIPTION OF REFERENCE NUMERALS 21, 41 First Operating Member
22, 42 Second Operating Member
26, 36 Mounting Surface
27, 47 Projection
28 Outer Wall Part

The invention claimed is:

1. A switch for a vehicle, the switch comprising:
 a first operating member provided on a mounting surface of the vehicle, the first operating member being made from a single member, the first operating member being operable by tilting;
 a plurality of pressable portions provided on outer rim parts of the first operating member, the pressable portions being operable by pushing;
 a plurality of cut out parts provided between the pressable portions, the cut out parts being formed so as to be lower than the pressable portions; and
 a curved part formed so that a width of a portion of the curved part is disposed between a pair of the cut out parts so that the curved part gradually become narrower as the curved part extends to each of the plurality of the pressable portions.

2. The switch for a vehicle according to claim 1, wherein the curved part is recessed so that a central part defines a location of maximum recess of the curved part.

3. The switch for a vehicle according to claim 1, wherein the first operating member is shaped as a circle seen from a frontal view, and the pressable portions are provided along a concentric circle with respect to a central portion of the first operating member.

4. A switch for a vehicle, comprising:
 a first operating member provided on a mounting surface of the vehicle, the first operating member being made from a single member, the first operating member being operable by tilting;
 a plurality of pressable portions provided on outer rim parts of the first operating member, the pressable portions being operable by pushing;
 a plurality of cut out parts provided between the pressable portions, the cut out part being formed so as to be lower than the pressable portions;
 a curved part formed so that a width of a portion of the curved part is disposed between a pair of the cut out parts so that the curved part gradually become narrower as the curved part extends to each of the plurality of the pressable portions; and
 an interior portion of the cut out parts that is formed so as to be placed between the pressable portions, the interior portion being connected by a ridge line that is gradually arched so as to be bent towards an inner side of the first operating member.

5. The switch for a vehicle according to claim 4, wherein the curved part is recessed so that a central part of the first operating member defines a location of maximum recess of the curved part.

6. The switch for a vehicle according to claim 4, wherein the first operating portion is shaped as a circle seen from a frontal view, and the pressable portions are provided along a concentric circle with respect to a central portion of the first operating portion.

7. A switch for a vehicle, the switch comprising:
a first operating member that is operable by tilting and is received in a steering wheel of the vehicle, the first operating member including
   a front side that faces away from the steering wheel,
   a back side that is opposite the front side, wherein the steering wheel includes a mounting surface that faces in a same direction as the front side of the first operating member so as to define a forward facing direction,
   a curved part that includes a center part, wherein the curved part is concavely shaped so that the central part defines a location of maximum depression of the curved part, and
   an outer wall part;
a plurality of projections arranged along the outer wall part and being operable by pushing, each of the projections extending in the forward facing direction a distance that is greater than a distance between the back side and the central part of the operating member in the forward facing direction, wherein each of projections extends in the forward facing direction a distance that is greater than a distance between the back side and the mounting surface in the forward facing direction; and
a plurality of cut out parts with cut out part surfaces, wherein the cut out part surfaces face the forward facing direction and the cut out parts are alternatingly disposed with the projections so that one of the cut out parts is between a pair of the projections, and wherein a width of a portion of the curved part is disposed between a pair of the cut out parts so that the curved part gradually become narrower as the curved part extends to each of the plurality of projections.

8. The switch for a vehicle according to claim 7, wherein the cut out part is recessed from the mounting surface so that a distance between the cut out part surface and the back side is less than a distance between the mounting surface and the back side.

9. The switch for a vehicle according to claim 7, further comprising a second operating member that is received by the central part of the first operating member, wherein the second operating member has a convex shape.

10. The switch for a vehicle according to claim 9, wherein the second operating member extends in the forward facing direction a distance that is greater than a distance between the back side and the mounting surface in the forward facing direction.

11. The switch for a vehicle according to claim 9, wherein the second operating member includes a peak part, and wherein a distance between the back side and the peak part is equal to a distance between the back side and the mounting surface.

12. The switch for a vehicle according to claim 7, wherein the outer wall part is at a right angle to the cut out part.

* * * * *